United States Patent Office 3,652,470
Patented Mar. 28, 1972

3,652,470
HEAT-CURABLE COMPOSITIONS COMPRISING PARTIALLY CRYSTALLINE UNSATURATED POLYESTER
Rolf Zimmermann and Wolfram Busch, Wiesbaden-Biebrich, and Josef Schmitz, Laubenheim (Rhine), Germany, assignors to Chemische Werke Albert, Wiesbaden-Biebrich, Germany
No Drawing. Continuation-in-part of application Ser. No. 441,897, Mar. 22, 1965. This application July 14, 1969, Ser. No. 841,566
Claims priority, application Germany, Apr. 4, 1964, C 32,568
Int. Cl. C08f 21/04
U.S. Cl. 260—22 CB         11 Claims

ABSTRACT OF THE DISCLOSURE

A heat curable partially crystalline unsaturated polyester having an acid value below 50, the acid component derived from 40–80 mol percent maleic units that are 50–85% converted to fumaric units in the esterification reaction and 60 to 20 mol percent of a dicarboxylic acid selected from the group consisting of (A) terephthalic units and (B) a combination of at least 4 mols of terephthalic units with 1 mol of at least one other dicarboxylic acid containing 3 to 10 carbon atoms and having no polymerisable olefinic bond, the content of terephthalic units being always at least 20 mol percent, and the alcohol component of the polyester derived substantially from dihydric alcohols, at least 30 mol percent of which have two hydroxy groups of equal reactivity and also a symmetrical molecule.

---

This application is a continuation-in-part of application Ser. No. 441,897, filed Mar. 22, 1965 which has been abandoned.

This invention is concerned with improvements in or relating to heat-curable compositions.

Heat-curable compositions have already been proposed which comprise a crystallizable unsaturated polyester having an acid value below 50, the acid component of which consists (A) of 90 or more mol percent of fumaric units and up to 10 mol percent of terephthalic units or of units of other non-polymerizable dicarboxylic acids, or (B) of from 30 to 60 mol percent of fumaric units and from 70 to 40 mol percent of terephthalic units, and the alcoholic component of which is derived substantially from dihydric alcohols containing two hydroxy groups of equal reactivity and also having a symmetrical molecule, a polymerizable vinyl monomer being liquid at room temperature, a polymerization catalyst active at a temperature above 65° C., a lubricating agent and preferably also a filler and/or fibrous material. When producing such a composition a plastic mouldable mass is first formed which then solidifies on further mixing and cooling of the components to a tack-free product in which the unsaturated polyester is present in the form of crystals containing polymerizable monomer. The resultant composition is grindable, completly dry, and has a good shelf-life.

It is an object of the invention to improve the aforementioned compositions. This improvement is achieved by modifying the said polyesters in a manner such that they are only partially crystalline and have a reduced reactivity. Due to this reduced reactivity the flow properties of the moulding composition at elevated temperatures may be varied within certain limits at will. Due to the reduced crystallinity the melting point of the polyester, the softening range and the hardening time of the moulding composition may also be varied within certain limits. For these reasons the moulding compositions of the invention are particularly suitable for processing in an injection press. Furthermore more time is available for the admixture and homogenizing of the components and the security to handle these compositions is increased. The crystallization during the rolling process is retarded so that a premature crystallization which would render the composition unsuitable is avoided. Due to the disturbed crystal structure of the polyesters, the moulding compositions containing the converted maleic acid may be processed with much less difficulty and trouble.

It is also an object of the invention to produce moulding compositions which are characterized by a more even hardening than the above-mentioned compositions. As a result therefrom the surface resistance and the dielectric strength of shaped bodies produced from the compositions are increased and the dissipation factor tan $\delta$ is reduced. Another advantage consists in the fact that shrinking and the water absorption of shaped bodies produced from the compositions are also reduced. Additionally the dielectrical properties are only slightly, if at all, impaired upon storing, even under humid conditions.

According to the present invention there is provided a heat-curable dry composition comprising a partially crystalline unsaturated polyester having an acid value below 50, the acid component of which is derived from 40 to 80 mol percent of maleic units and from 60 to 20 mol percent of units of a dicarboxylic acid selected from the group consisting of (A) terephthalic units and (B) a combination of at least 4 mols of terephthalic units with 1 mol of units of at least one other dicarboxylic acid containing from 3 to 10 carbon atoms and having no polymerizable olefinic bond, the content of terephthalic units being, however, always at least 20 mol percent, and the alcohol component of the polyester derived substantially from dihydric alcohols, at least 30 mol percent of which have two hydroxy groups of equal reactivity and also a symmetrical molecule, a vinyl monomer being liquid at room temperature, a polymerization catalyst active at temperatures above 60° C., a lubricating agent and at least one filling or fibrous material, and wherein the maleic units have predominantly been converted to fumaric units in the esterification procedure.

The expression "unit" means an acid or its anhydride —if it exists—or both. The term "filling or fibrous material" also comprises both of these materials.

The present invention also includes a similar composition suitable for conversion to a heat-curable composition, without the catalyst.

In a preferred composition the maleic units have been converted to fumaric units in an amount of from 50 to 85 percent by weight. As a result of the presence of maleic units instead of fumaric units the polyesters of the present invention are only "partially" crystalline. Thus they have a higher solubility in solvents such as vinyl or allyl compounds than the above-mentioned more crystalline esters. By varying the amount of the acid component, from within the ranges specified for this invention, the melting ranges of mixtures of the polyesters with fillers or fibrous material can be modified. For example the melting range can be reduced from about 100° C. to a lower or less. This has the advantage that the heat-curable compositions of the present invention can be prepared at comparatively low temperatures since the polyester is easily melted and therefore they may be processed more easily. Less heat is thus required and the risk of premature activation of any organic peroxide or other catalyst used is mitigated. The compositions also have a lower viscosity at any given elevated temperature and can thus be more easily moulded e.g. in injection moulding machines. They are thus suitable for the preparation of thick-walled shaped bodies having good mechanical and excellent electrical properties and also being free from strains and flaws.

The preferred compositions are those whose acid component is derived from 55 to 65 mol percent maleic acid units and 45 to 35 mol percent of terephthalic acid units, one particularly preferred ratio is about 60 mol percent maleic acid units to about 40 mol percent terephthalic acid units. These polyesters have a good combination of properties in that although there is a desired reduction in the degree of crystallinity i.e. the polyester is what we term "partially crystalline," the melting range is not excessively depressed.

Polyesters may also be used in which up to one fifth (calculated on a mol percentage basis) of the terephthalic acid is replaced by one or more other dicarboxylic acids having 3 to 10 carbon atoms which we term "the other dicarboxylic acid," but the minimum amount of 20 mol percent of terephthalic acid is maintained. This "other" dicarboxylic acid which preferably is a carbocyclic dicarboxylic acid more preferably has from 3 to 8 carbon atoms and no polymerizable olefinic double bond. If the amount of "other" dicarboxylic acid is appreciably more than the one fifth stated then there is a likelihood of a non-crystalline polyester being produced.

Examples of such "other" dicarboxylic acids are cyclohexane-p-dicarboxylic acid, o-phthalic acid, isophthalic acid, Δ-4,5-tetra- or hexahydrophthalic acid, endomethylene-tetra-hydrophathalic acid, succinic acid, adipic acid, azelaic acid and sebacic acid. Instead of free acids there ester-forming derivatives may also be used, for example the anhydrides or dialkyl esters, in which the alkyl group may contain e.g. up to 6 carbon atoms. Thus, high-molecular weight polyterephthalate wastes which have been reacted with maleic acid, maleic anhydride or dialkyl maleates and/or symmetrical diols of the said kind, if desired in admixture with unsymmetrical diols, may be used.

As the symmetrical portion of the alcoholic component ethylene glycol is preferred.

The use of the diols having a symmetrical molecule as the alcoholic component tends to give a more crystalline polyester whilst the greater the amount of unsymmetrical diol used the lower the degree of crystallinity resulting.

Further symmetrical diols are for example diethylene glycol, propanediol-1,3, butanediol-1,4, butanediol-2,3, Δ-2,3-butenediol-1,4, 2,2-dimethylpropanediol-1,3, 1,4-dimethylol-cyclohexane, 4,4'-dihydroxydicyclohexylpropane or the homologues thereof or the bis-ethylene, bis-propylene or bis-butylene glycol ethers thereof or such ethers of 4,4'-dihydroxydiphenylpropane or homologues thereof. The preferred unsymmetrical diol is propanediol-1,2, particularly if ethylene glycol is used as a symmetrical diol. The use of propanediol-1,2 also reduces—compared with ethylene glycol—the water absorbing and shrinking properties of shaped bodies produced from the compositions. Other unsymmetrical diols are for example butanediol-1,2, butanediol-1,3, pentanediol-1,4 and unsymmetrical ethers of dihydroxy-diphenylpropane containing hydroxyl groups, or the homologues thereof or 1,3-dimethylolcyclohexane. Polyesters derived from approximately equimolecular amounts of acids and dihydric alcohols are particularly preferred. One of these reactants should generally not be present in an excess of more than 5 equivalent percent, preferably not more than 2 equivalent percent over the other reactant. By a suitable selection of the dihydric alcohols used or by using mixtures of alcohols, the degree of crystallinity of the polyesters may also be varied. The temperature at which the polyester resin "crystallizes" in the heat-curable compositions of the present invention i.e. when mixed with the vinyl monomer and optionally also fillers and fibrous materials can thus be varied at will within certain ranges by varying the ratio of "symmetrical" to "unsymmetrical" diol. This is important in that when a heat-activated catalyst is incorporated into the heat-curable composition the melting point of the composition must be below the activation temperature of the catalyst. The melting point is generally in the range of from room temperature to about 50° C., it being noted that this is below the activation temperature of the peroxide polymerisation catalysts.

Preferred vinyl monomers are those having a boiling point above 140° C., especially above 170° C., e.g. styrene, m- or p-vinyltoluene, halogenated styrene, α-methylstyrene, diallylmaleate, -fumarate, -itaconate, -succinate, -adipate, -azelate, -sebacate, -phthalate, -isophthalate, triallylcyanurate, triallylphosphate, allyl ethers of polyhydric alcohols, such as pentaerythritol-tetraallyl ether or trimethylolpropane-triallyl ether, ethylene glycol-dimethacrylate or hexahydro-1,3,5-triacrylotriazine. The vinyl monomer of choice is diallylphthalate.

The compositions of the present invention generally have a low viscosity such that the incorporation of quite high proportions of fillers and fibrous material thereinto presents little difficulty. Generally the proportion of vinyl monomers in the composition is from 5 to 50, preferably from 10 to 40%, calculated on the weight of the mixture of polyester and monomer. The weight of fillers and/or fibrous material used may vary in wide limits and may be e.g. from 50 to 80%, calculated on the weight of the composition.

The polymerization catalyst is preferably a free radical polymerization catalyst e.g. an organic peroxide. Organic peroxide catalysts include benzoyl-peroxide, 2,4-dichlorobenzoylperoxide, tert.-butyl-peroxide or -hydroperoxide, lauroylperoxide, cyclohexanoneperoxide, cumolhydroperoxide, tert.-butylperacetate, tert.-butylperbenzoate, mono-tert.-butylpermaleate, tert.-butyleroctoate, 2,5-dimethyl-2,5 - di(benzoylperoxy)-hexane, 2,5-dimethyl-2,5-di(tert.-butylperoxy)-hexane and 2,5 - dimethyl-2,5-di(tert.-butylperoxy)-hexyne. These peroxides are generally used in an amount of 0.5 to 5, preferably of 1 to 4%, calculated on the total weight of the polyester and the monomer. The decomposition temperature of the peroxide compounds is dependent on the structure of the catalyst and generally lies between 60 and 80° C., however in some instances it lies above 80 or even above 100° C. The lubricant used may be any conventional one e.g. a salt of stearic acid, generally in an amount of 0.5–3, preferably 1–2% by weight, calculated on the final product.

The composition may be prepared by mixture of the ingredients in any desired order. This is usually done by simply mixing the various constituents in appropriate aggregates and warming. The homogeneous mass is then allowed to cool e.g. in the form of a sheet, which takes about half an hour up to about two hours, dependent on the nature of the polyester. The resulting product is compact and dry.

Particularly, if compositions are to be prepared containing large proportions of fibrous materials, for example at least 15%, preferably between 20 and 40, calculated on the total weight of the moulding compositions, i.e. inclusive of the weight of the fillers and fibrous materials, the mechanical properties of moulded parts produced therefrom are considerably improved by mechanically comminuting the cooled composition, preferably in a cross-beater mill. In this way, a voluminous fibrous composition is obtained in which the glass fibres are not quite destroyed. The appearance of the composition is considerably improved by this procedure.

If minor proportions, for example 5 to 10% by weight, calculated on the weight of the moulding composition, of voluminous fibrous materials are used, the material to be mixed is preferably passed through a cooled roll system. The resulting sheet solidifies after a short storage at room temperature and may be comminuted in suitable milling devices to a dry pourable granulate.

The compositions of the present invention can thus be prepared from the individual ingredients by a process which has the advantage of not involving the use of organic solvents. The compositions have a good shelf-life partly because they are dry. Since only short mechanical mixing is required the fillers and fibrous materials used are not disintegrated very much. Excessive distintegration of these materials, particularly in the case of glass fibres considerably reduces the strength of articles produced from such a composition.

The compositions of this invention have good mechanical properties and are useful for producing a wide variety of shaped and moulded articles which can be produced by moulding or injection moulding. They are particularly suited for electrical application since they possess low water absorption properties as well as good dielectric and surface leakage properties. The dissipation factor is small and remarkably constant over a wide temperature range.

In order that the invention may be well understood the following examples are given by way of illustration only.

EXAMPLE 1

250 g. of a crystallizable molten unsaturated polyester having an acid value of 35 produced from equivalent amounts of acid and alcohol (60 mol percent of maleic anhydride, 40 mol percent of terephthalic acid, 100 mol percent of ethylene glycol), 10 g. of benzoyl peroxide, 10 g. of zinc stearate, 20 g. of diallyl-phthalate, 500 g. of ground limestone, 110 g. of ground kaoline, and 100 g. of "volanized" (provided with binding agents) short glass fibres were mixed on a rolling mill to 50° C. The maleic anhydride in this polyester, which is used as a starting material, has been partially isomerized to fumaric acid in an amount of from 50 to 85 percent by weight. The flexible sheet formed was stored at room temperature for half to one hour and pulverized in a cross-beater mill after solidification.

Properties of the materials in a hardened state: Bending strength 700 kg./cm.$^2$, impact strength 5 kg. cm./cm.$^2$, Martens dimensional stability under heat 95° C., dissipation factor tan $\delta$ 0.006, shrinking 0.5%.

EXAMPLE 2

250 g. of a crystallizable molten unsaturated polyester having an acid value of 30 prepared from equivalent amounts of acid and alcohol (40 mol percent of maleic anhydride, 50 mol percent of terephthalic acid, 10 mol percent of adipic acid, 100 mol percent of ethylene glycol and in which polyester the maleic anhydride has been partially isomerized to fumaric acid in an amount of from 50 to 85 percent by weight), 10 g. of 2,5-dimethyl-2,5-di-(tert.-butylperoxy-)hexane, 10 g. of zinc stearate, 30 g. of diallylphthalate, 410 g. of ground lime stone and 300 g. of "volanized" long glass fibres (length of cut 13 to 26 mm.) were mixed in a mixer heated to 80° C.

After a short storage, e.g. after one hour, the mixture solidified but could be easily loosened in an unravelling machine.

EXAMPLE 3

240 g. of an unsaturated polyester (acid value 35) having a partially crystalline structure of which the amorphous phase has a flow point of 70° C. and produced from equivalent amounts of acid and alcohol (70 mol percent of maleic anhydride, 30 mol percent of terephthalic acid, 50 mol percent of ethylene glycol, 50 mol percent of propanediol-1,2 and in which polyester the maleic anhydride has been partially isomerized to fumaric acid in an amount of from 50 to 85 percent by weight) were mixed in the molten state with 30 g. of diallylphthalate, 10 g. of tert.-butylperoctoate, 10 g. of zinc stearate, 210 g. of ground kaoline, 400 g. of ground limestone and 100 g. of "volanized" short glass fibres and the mixture was processed to sheets on a heated roll mill. After a short period the material solidified. It was comminuted in a cross-beater mill. The non-caking granulate could be processed on a press at 160° C. and a pressure of 200 kg./cm.$^2$, the hardening time being 10 sec./mm. thickness of layer.

Properties

Bending strength 700 kg./cm.$^2$, impact strength 4,5 kg. cm./cm.$^2$, Martens dimensional stability under heat 100° C., dissipation factor tan $\delta$ 0.007, shrinking 0.6%.

EXAMPLE 4

300 g. of an unsaturated polyester (acid value 30) having a partially crystalline structure and a flow point of the amorphous phase of 80° C. and produced from equivalent amounts of acid and alcohol (60 mol percent of terephthalic acid, 40 mol percent of maleic anhydride, 60 mol percent of propanediol-1,2, 40 mol percent of ethylene glycol and in which polyester the maleic anhydride has been partially isomerized to fumaric acid in an amount of from 50 to 85 percent by weight) were mixed in the molten state in a mixer heated to 90° C. with 40 g. of diallylphthalate, 10 g. of tert - butyl - perbenzoate (95%), 10 g. zinc stearate and 540 g. of ground limestone until a low-viscous paste was obtained; 200 g. of "volanized" long glass fibres having a cut length of 13 mm. were mixed in and covered with the semiliquid mixture. After cooling the voluminous composition solidified by itself.

Properties

Bending strength 800 kg./cm.$^2$, impact strength 10 kg. cm./cm.$^2$, Martens dimensional stability under heat 140° C., dissipation factor tan $\delta$ 0.005, shrinking 0.6%.

EXAMPLE 5

(A) Comparison (prior art)

($A_1$) A high-molecular weight polyester of equimolecular amounts of terephthalic acid and ethylene glycol was reacted for about 4 to 5 hours at a temperature of 180 to 220° C. with the same molar amount of ethylene glycol contained in the polyester. After cooling to 150° C. the same molar amount of fumaric acid as of the terephthalic acid units was added and the reaction was continued for about 5 hours during which the temperature was increased up to about 200° C. A polyester with an acid number of 42 was obtained.

($A_2$) Dimethylterephthalate was reacted at a temperature of 150 to 200° C. for about 8 hours in a conventional manner with the same molar amount of butanediol-1 as that of the methanol component. Then the same molar amount of fumaric acid as that of the terephthalic acid was added to the reaction mixture at a temperature of about 150° C. The esterification was continued for about 6 hours during which the temperature was increased to about 200° C. A polyester with an acid number of 57 was obtained.

(B) Invention ($B_1$) In the same manner as sub ($A_1$) a polyester with an acid number of 39 consisting of 50 mol percent of terephthalic acid, 50 mol percent of maleic acid and 100 mol percent of ethylene glycol was prepared.

($B_2$) In the same manner as sub ($A_2$) a polyester with an acid number of 48 consisting of 50 mol percent of terephthalic acid, 50 mol percent of maleic acid and 100 mol percent of butanediol-1,4 was prepared. In experiments $B_1$ and $B_2$ the ratio of acid and hydroxy groups was thus also 1:1, and also the molar proportion between maleic acid and the terephthalic acid.

(C) Analysis of samples $A_1$, $A_2$, $B_1$ and $B_2$

To control the amount of maleic acid on the one hand and that of fumaric acid on the other hand in samples $A_1$, $A_2$, $B_1$ and $B_2$ infrared spectrograms were made with samples. The measurement was made with an infrared spectralphotometer model 21 of Perkin-Elmer Corp. using a sodium chloride prisma and a wave length range of 2 to 15$\mu$. The wave length of 10.25$\mu$ is characteristic for fumaric acid ester and is not disturbed by other bands. At this wave length the extinction was calculated from the logarithmus of the proportions of the distances between the minimum of the curves and the basic line. The curve of $A_1$ was compared with that of $B_1$ and the curve of $A_2$ with that of $B_2$. The isomerization degree, i.e. the proportion (in percent by weight) of maleic acid having been converted to fumaric acid was found as follows:

|  | Percent |
|---|---|
| Polyester $B_1$ | 63 |
| Polyester $B_2$ | 58 |

Polyester $A_1$ and $A_2$ did of course contain no maleic units. From these results it is proved that under the reaction conditions for preparing the polyester a substantial part of maleic acid in the resins $B_1$ and $B_2$ is not isomerized, and that the isomerization is by no means quantitative.

(D) Molding compositions based on A and B

Molding compositions were prepared from the polyesters $A_1$, $A_2$, $B_1$ and $B_2$ as follows:

25 g. of each of the polyesters described above were mixed with 1 g. of diallyl phthalate, 2 g. of a paste of benzoyl peroxide (50% by weight in dimethyl phthalate), 1.5 g. of zinc stearate as a lubricant, 41.5 of ground limestone, 14 g. of kaolin and 15 g. of glass fibres as a filler.

The mixtures were homogenized on a rolling mill for 30 seconds, the rolls of which were rotated in a proportion of 15:14. One roll had a temperature of about 70° C. and the other one a temperature of about 30° C.

The characteristics of the molding compositions and of the basic polyesters are shown in the following table.

weight of the polyesters. Thus, the resin is relatively diluted. If the amount of the polyesters would be higher, the differences between the compositions $A_1$ and $A_2$ on one hand and $B_1$ and $B_2$ on the other hand would be essentially increased.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What is claimed is:

1. A heat-curable dry composition comprising an unsaturated polyester having an acid value below 50, the acid component of which is derived from 40 to 80 mol percent of maleic units and from 60 to 20 mol percent of units of a dicarboxylic acid selected from the group consisting of (A) terephthalic units and (B) a combination of at least 4 mols of terephthalic units with 1 mol of units of at least one other dicarboxylic acid containing from 3 to 10 carbon atoms and having no polymerizable olefinic bond, the content of terephthalic units being, however, always at least 20 mol percent, and the alcohol component of the polyester derived substantially from dihydric alcohols, at least 30 mol percent of which have two hydroxy groups of equal reactivity and also a symmetrical molecule, a vinyl monomer being liquid at room temperature, a polymerization catalyst active at temperatures above 60° C., a lubricating agent and at least one filling or fibrous material, and wherein the maleic units have

| Characteristics | Prior art | | Invention | |
|---|---|---|---|---|
|  | $A^1$ | $A^2$ | $B^1$ | $B^2$ |
| Acid number of polyester | 42 | 57 | 39 | 48. |
| Melting range of polyester (° C.) | 58–77 | 78–106 | 58–77 | 85–108. |
| Crystallization time of polyester (min. and sec.).[1] | 7 min., 2 sec. | 7 min., 19 sec. | 9 min., 34 sec. | 7 min., 49 sec. |
| Solidification time of molding composition [2] | 6 min. | 8 min. | >2 hours | 12 min. |
| Chemical reactivity of molding composition: |  |  |  |  |
| (a) Maximum temperature (° C.) | 160 | 164 | 161 | 163. |
| (b) Hardening time (min. and sec.) | 2 min., 26 sec. | 1 min., 57 sec. | 2 min., 35 sec. | 2 min., 34 sec. |

[1] The crystallization time of the polyesters is the period which was measured when cooling 10 g. of a melt of 150° C. in a cylindrical mold of a diameter of 2 cm. until crystallization occurred.
[2] The solidification time is defined as follows: A sheet having a weight of 1 kg. and a thickness of 1 mm. and being in the plastic state is allowed to cool down at room temperature until it has such a standardized degree of hardness that it is capable of being ground.

This increased solidification time of molding compositions based on resins $B_1$ and $B_2$ is very surprising in view of the fact that the crystallization time of the polyesters themselves is increased by only a small extent and a number of other characteristics of the molding compositions is only slightly influenced, such as the maximum temperature and the hardening time of molding compositions $A_1$ and $B_1$. An increase of the solidification time of 4 minutes as in molding composition $B_2$ compared with $A_2$ is an important advance in the art since the compounding period may be prolonged. Thus, more time will be available for the admixture and homogenizing of the components, and the security to handle these compositions and to produce articles of a good quality is increased. Furthermore crystallization during the rolling process is retarded so that a premature crystallization which would render the composition unsuitable, is avoided.

It is evident from the tablet that the molding compositions containing maleic acid have a much longer solidification time. This is caused by their disturbed crystal structure. Therefore the molding compositions containing maleic acid may be processed with much less difficulty and trouble. In a number of instances additionally the hardening time is considerably prolonged as is evident from a comparison of molding compositions $A_2$ and $B_2$ where the increase is from 117 to 154 seconds, e.g. more than 30 percent. Such an increase of the hardening time has the advantage that the intensity of the hardening is decreased so that the molding compositions may be hardened to yield molded articles with less strain. In the present case the molding compositions have only a content of 25% by been converted to from about 50 to 85 percent by weight of fumaric units in the esterification procedure.

2. A heat-curable composition as claimed in claim 1, wherein the acid component is derived from 55 to 65 mol percent of maleic units and from 45 to 35 mol percent of terephthalic units.

3. A composition as claimed in claim 1, wherein none of the components dicarboxylic acid units and dihydric alcohol units is present in an excess of more than 5 equivalent percent over the other.

4. A composition as claimed in claim 1, wherein the polymerizable liquid vinyl monomer has a boiling point above 140° C. and is present in the composition in an amount between 5 and 50%, calculated on the weight of the mixture of the polyester and the monomer.

5. A composition as claimed in claim 1, in which a fibrous material is present in an amount of at least 15%, calculated on the weight of the composition.

6. A composition as claimed in claim 1, wherein the total amount of the filling and fibrous material together is in the range of from 50 to 80%, calculated on the weight of the composition.

7. A composition as claimed in claim 1, wherein the dihydric alcohol component consists substantially of a mixture of a propanediol-1,2 and a dihydric alcohol having a symmetrical molecule and two hydroxy groups of equal reactivity.

8. A composition as claimed in claim 1, wherein the acid component is derived from 55 to 65 mol percent of maleic units and from 45 to 35 mol percent of terephthalic units, and the alcohol component of the polyester is derived from ethylene glycol and propanediol-1,2, 10 to 40%, calculated on the total weight of the polyester and the monomer, of a vinyl monomer having a boiling point above 170° C., 1 to 4%, calculated on the total weight of the polyester and the monomer, of the polymerization catalyst, 0.5 to 3%, calculated on the weight of the composition, of a salt of stearic acid acting as a lubricant, and at least 5% calculated on the weight of the composition, of the filling or fibrous material.

9. Moulded bodies prepared from the heat-curable composition of claim 1.

10. A dry composition comprising polymerizable vinyl monomer being liquid at room temperature and a partially crystalline unsaturated polyester having an acid value below 50, the acid component of which is derived from 40 to 80 mol percent of units of maleic acid and from 60 to 20 mol percent of units of a dicarboxylic acid selected from the group consisting of (A) terephthalic units and (B) a combination of at least 4 mols of terephthalic units with 1 mol of units of at least one other dicarboxylic acid containing from 3 to 10 carbon atoms and having no polymerizable olefic-bond, and the alcohol component of which is derived substantially from dihydric alcohols, at least 30 mol percent of which have two hydroxy groups of equal reactivity and also a symmetrical molecule, and wherein the maleic units have been converted to from about 50 to 85 percent by weight of fumaric units in the esterification procedure.

11. A composition as claimed in claim 10 in admixture with a lubricating agent.

References Cited

UNITED STATES PATENTS

| | | | |
|---|---|---|---|
| 2,843,556 | 7/1958 | Moorman | 260—28.5 |
| 2,855,373 | 10/1958 | Guenther | 260—29.6 |
| 2,985,615 | 5/1961 | Tunteler | 260—22 |
| 3,112,283 | 11/1963 | Hansen et al. | 260—22 |
| 3,427,267 | 2/1969 | Stieger et al. | 260—22 |

FOREIGN PATENTS

| | | | |
|---|---|---|---|
| 637,412 | 9/1963 | Belgium | 260—861 |
| 993,378 | 5/1965 | Great Britain | 260—861 |

DONALD E. CZAJA, Primary Examiner

R. W. GRIFFIN, Assistant Examiner

U.S. Cl. X.R.

260—23 P, 40 R, 861